April 29, 1952  J. CARMONA  2,594,867
ROTARY WINDSHIELD
Filed March 11, 1948  3 Sheets-Sheet 1
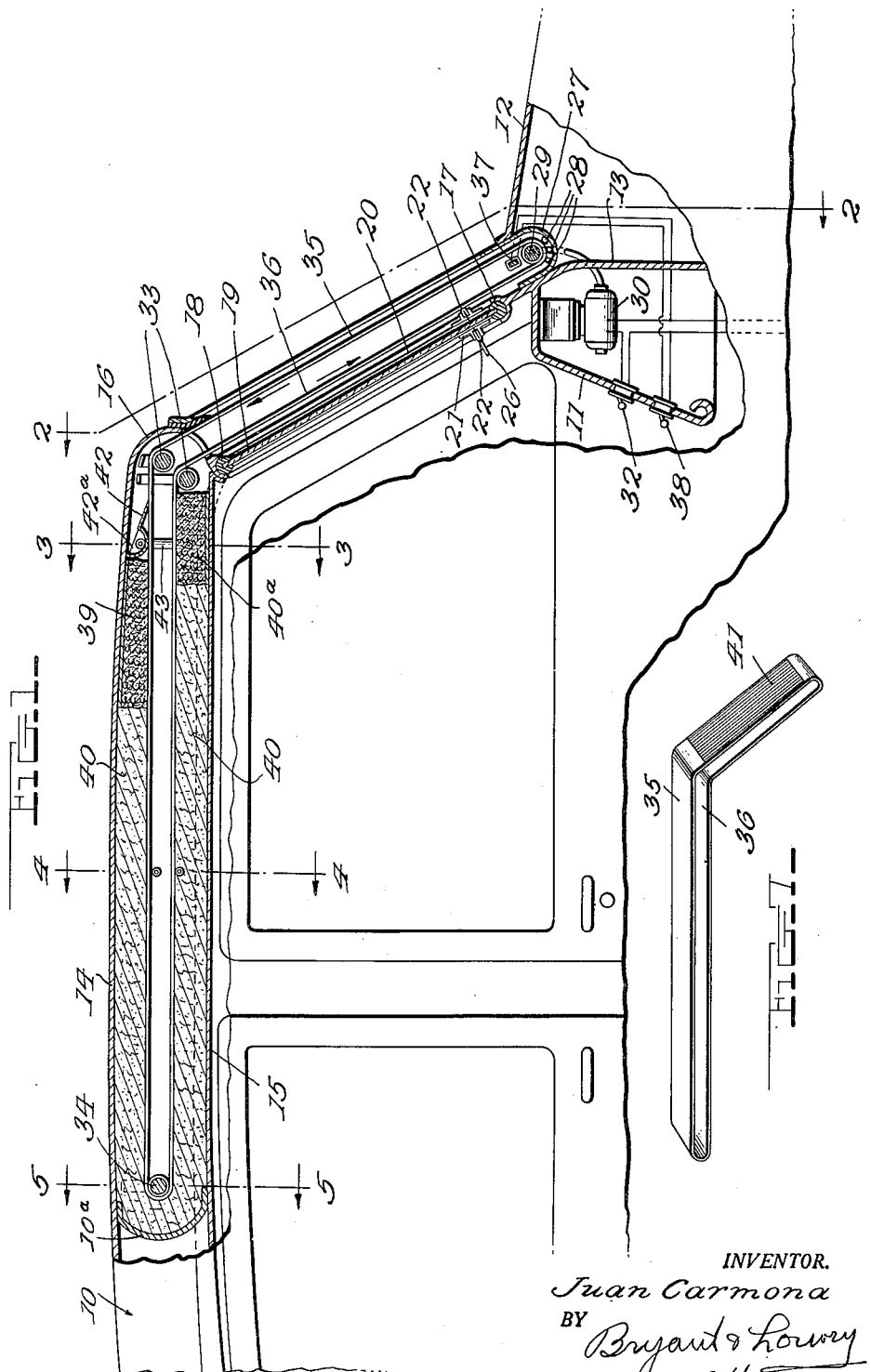
INVENTOR.
Juan Carmona
BY Bryant & Lowry
Attys.

April 29, 1952 J. CARMONA 2,594,867
ROTARY WINDSHIELD
Filed March 11, 1948 3 Sheets-Sheet 2
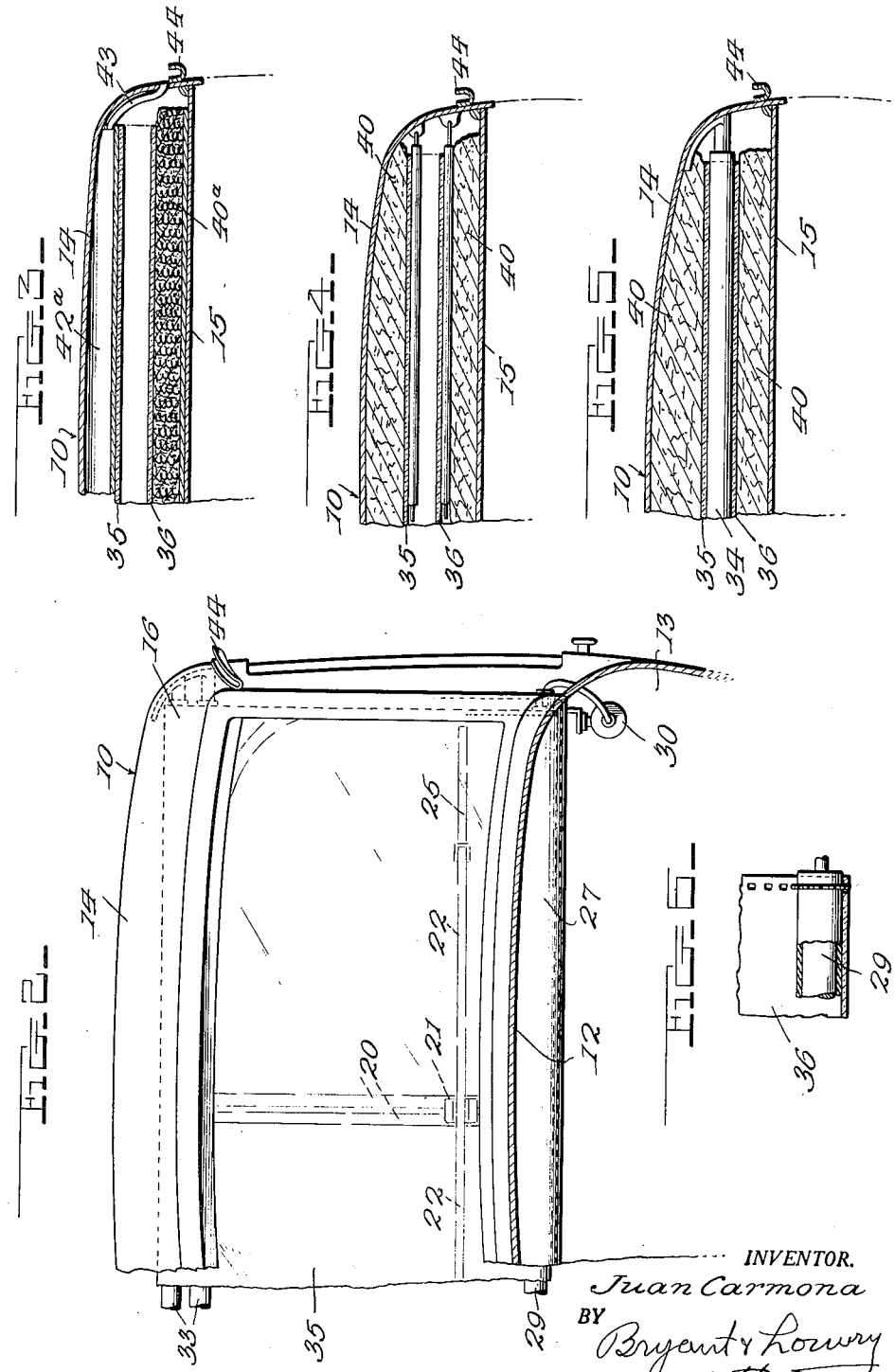

April 29, 1952     J. CARMONA     2,594,867
ROTARY WINDSHIELD
Filed March 11, 1948     3 Sheets-Sheet 3
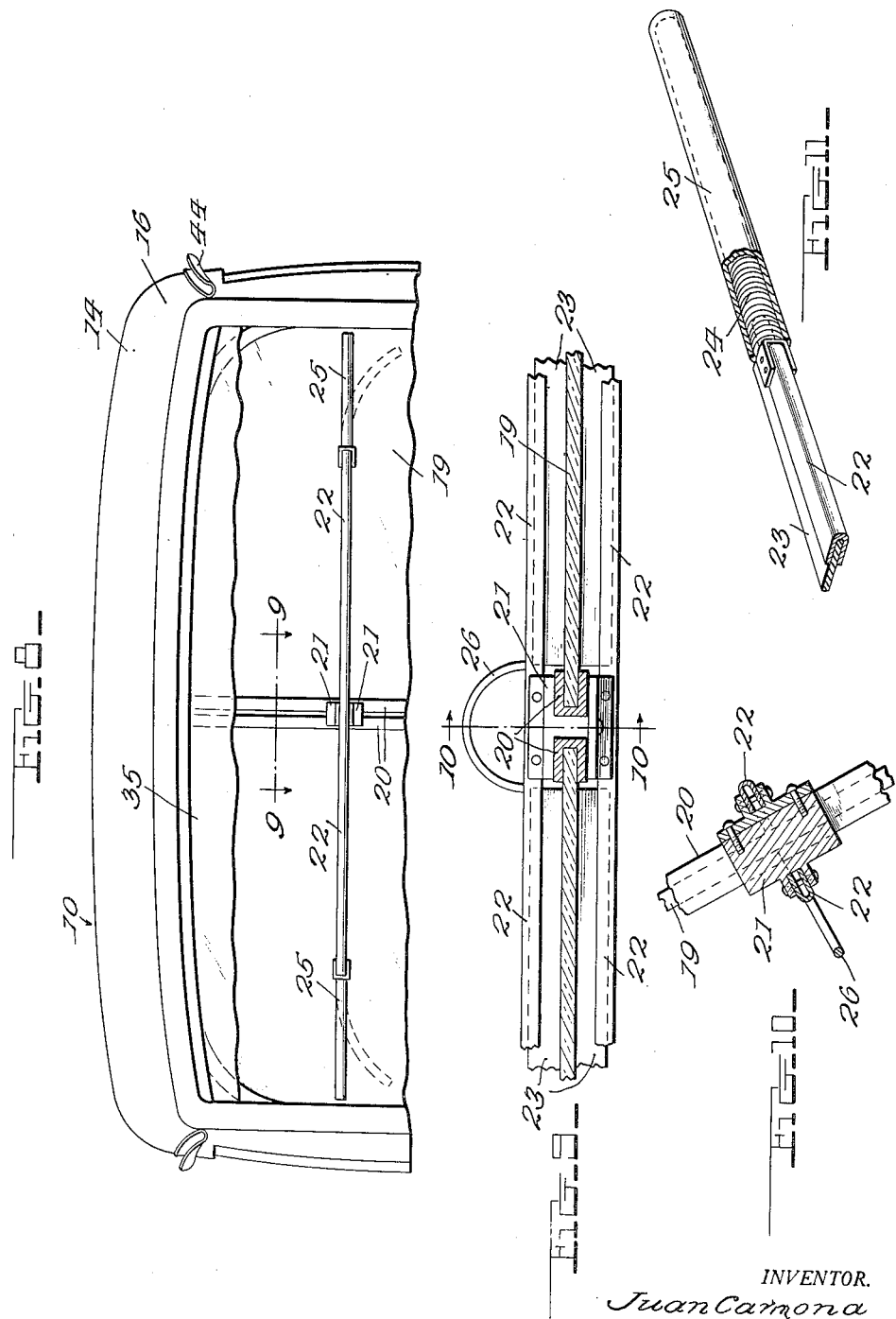
INVENTOR.
Juan Carmona
BY Bryant & Lowry
attys.

Patented Apr. 29, 1952

2,594,867

UNITED STATES PATENT OFFICE 2,594,867

ROTARY WINDSHIELD

Juan Carmona, Miami, Fla.

Application March 11, 1948, Serial No. 14,208

5 Claims. (Cl. 296—84)

This invention relates to windshields such as are used on automobiles and other vehicles and has special reference to a windshield wiper and guard.

One important object of this invention is to provide for continuing visibility of the windshield of an automotive vehicle.

Another important object of this invention is to provide novel means whereby rays from the sun, either direct or reflected, will not interfere with the vision of a person driving a vehicle equipped with the invention.

A further object of the invention is to provide a novel device for the purpose set forth which will not only permit clarity of vision by the operator of the vehicle but also clarity of vision for all others in the vehicle.

A still further object of the invention is to provide a novel device for preventing fog or mist from obscuring the windshield.

Again, an object of the invention is to provide a novel device of this character which will eliminate or reduce the glare from the headlights of approaching vehicles and from wayside lights.

Still further, it is an object of this invention to prevent the gathering of rain or the accumulation of snow on a vehicle windshield.

With the above and other objects in view, the invention consists in general of certain novel details of construction and combinations of parts hereinafter fully described, illustrated in the accompanying drawings and particularly claimed.

In the accompanying drawings, like characters of reference indicate like parts in the several views, and Figure 1 is a view of a portion of the front of an automobile and showing in section, on the vertical median longitudinal plane, the present invention applied thereto;

Figure 2 is a view, in elevation and partly in section, on the line 2—2 of Figure 1;

Figure 3 is a fragmentary section on the line 3—3 of Figure 1;

Figure 4 is a fragmentary section on the line 4—4 of Figure 1;

Figure 5 is a fragmentary section on the line 5—5 of Figure 1;

Figure 6 is a detail, partly in section and partly in elevation, showing a portion of the apron drive used herein;

Figure 7 is a perspective view of the apron removed from the rest of the device;

Figure 8 is a view from the front seat of the vehicle looking forwardly and showing only a portion of the windshield, inner wiper and adjacent parts;

Figure 9 is a fragmentary enlarged section on the line 9—9 of Figure 8;

Figure 10 is a fragmentary section on the line 10—10 of Figure 9; and

Figure 11 is a perspective view of a flexible wiper end used in this invention.

In order to fully illustrate this invention and its application, there has been shown in the drawings a portion 10 of the forward part of an automobile. The part of the automobile shown is that just forward and above the front seat so there is disclosed the instrument board 11 and the rear portion 12 of the hood. This instrument board is carried by the front panel 13. The top of the automobile is formed by a roof 14 below which is a ceiling 15, the two being joined at their forward ends as at 16, while a closed chamber is formed between the top and ceiling by an arcuate member 10$^a$ extending transversely of the automobile top and between the top and ceiling at a point rearwardly of the front connection 16 between the top 14 and ceiling 15 as illustrated in Figure 1.

At the upper edge of the panel 13 there is provided a channel wherein is held a rubber or other cushioning strip 17, a similar strip 18 being held beneath the ceiling 15 so that a glass or other transparent windshield may be secured between these two cushions. This windshield is constructed in two panes, and at their proximal edges these panes are supported in channel bars 20 which, as best seen in Figures 8 and 9, are so spaced as to permit an H-shaped slide 21 to be moved up and down between the two panes. By means of this arrangement a person in the automobile may move the slide at will. The slide has projecting therefrom, both on the outer and inner sides of the windshield, blade carriers 22 carrying blades 23 which contact the faces of the windshield sections. Each of the blade carriers is provided with a flexible end 24 having a suitable rubber or other wiping covering 25. The blades thus accommodate themselves to the curved corners of the windshield frame. A handle 26 is provided to facilitate movement of the slide.

Between the panel 13 and the hood 12 is located a trough 27 having, at at least one end, drain holes 28. Extending across the automobile in this trough is a driving roller which is driven from a motor 30 located beneath the instrument board 11 of the automobile. This motor is connected to the automobile battery or other suitable current supply through a switch 32 located on the front of the instrument board 11. Just above the upper edge of the windshield 20 and between the roof 14 and ceiling 15 is a spaced pair of idler rolls 33, and located rearwardly of the rolls 33, and also between the roof 14 and ceiling 15, is an idler roll 34.

Trained around these rolls is an apron having an outer run 35 remote from the windshield and an inner run 36 relatively close to and parallel with the windshield. Between the inner and outer runs of the apron and adjacent the driving roller 29 is a heating element 37 controlled by a switch 38. As the apron is moved by the motor 30 it rubs against cleaning means 39 which preferably are of sheep's wool and against absorption means 40 of any suitable character.

At one part of its length the apron is provided with a section 41 of a character to subdue strong light rays.

Under ordinary circumstances the motor is not turned on but in rainy weather it is turned on. This causes the apron to travel around the rolls and keeps the same clear. Meanwhile the windshield is protected from the rain and the exposed surface of the apron is kept constantly dry. It is also to be noted that in freezing weather the heating element will prevent the accumulation of snow or sleet on the outer run of the apron. Again, it is to be noted that the movement of the apron may be stopped at any time so that the glare reducing section 41 may be held quiescent before the driver.

In addition to the cleaning means 39 and the absorption means 40 for the endless apron, there is provided, as shown in Figure 1, a scraper blade 42 with which the outer face of the outer run 35 passes in contact for the removal of water therefrom which is delivered into a transversely extending trough 42a at the rear edge of the scraper blade 42. Opposite ends of the trough 42a communicate with drain pipes 43 that are directd downwardly for discharge into the usual rain gutters 44 that extend longitudinally of the top of the car body at the outer sides thereof. It has been explained how the runs of the apron pass over the elements 39 and 40, and to insure a final cleaning and polishing medium for the inner downward run 36 of the apron, the latter passes over a second body as at 40a, also preferably in the nature of sheep's wool.

What is claimed is:

1. In windshield guard assemblages and in combination, an automobile body including a windshield, said body having its roof formed of the usual top and a ceiling extending from front to rear in approximate parallelism with the top and spaced therefrom a material distance to thereby form a space extending to and forward of the top of the windshield, said top and ceiling being connected by an arcuate member intermediate the ends of such space and remote from the front end thereof to thereby isolate the forward portion of the roof space with the distance between the front and rear ends of the isolated space being materially greater than the vertical dimension of the windshield, a transversely extending idler roll positioned at the axis of the curvature of the spaced arcuate member and a guard formation overlying the front of the windshield, said guard formation including an endless apron trained over a plurality of rolls including a transverse roll positioned forward of and below the bottom of the windshield and operatively mounted to be power-driven at will, said rear idler roll and a pair of idler rolls located in the front portion of said roof space to thereby provide a travel path for the apron overlying the front of the windshield and extending rearward in said roof zone space with the apron positioned for travel in two parallel flights extending between the power-driven roll and the rear idler roll, means positioned between the apron flights and the spaced top and ceiling for clearing and drying the face of the apron exposed at the front of the guard formation, said means being cooperative with the apron face throughout substantially the length of the portion of the apron located within such roof space.

2. An assemblage as in claim 1 comprising an electric motor operatively connected with the automobile battery and a switch mounted on the instrument board of the automobile for controlling the motor to thereby enable operator control of the apron position and movement.

3. An assemblage as in claim 2, characterized in that the apron includes a glare-excluding zone extending transversely of the direction of travel of the apron and throughout the width of the apron, the width dimension of the zone being relatively small as compared with the length of the apron travel path, said glare-excluding zone advancing with the apron during travel by motor activity and being retained in fixed position by motor inactivity.

4. An assemblage as in claim 1, characterized in that the clearing and drying means is zonal in type with an intermediate zone as of the greatest length and extending in both of said flights to serve as a drying zone, upper and lower zones at the forward ends of said intermediate zone located respectively in separate flights and serving as moisture removing zones, and a scraper blade formation in advance of the upper zone and serving to clear the apron of water droplets and other deposits, the blade formation being operatively mounted within the roof zone space and formed to deliver the removed content to the exterior of the automobile.

5. An assemblage as in claim 1 including an electric heating element positioned between the apron flights in the vicinity of the driving roller supporting the apron to thereby heat the space between the opposite flights of the apron, means connecting the electric heater with the battery of the automobile, and a switch assembly on the instrument board of the automobile for the control of the heater.

JUAN CARMONA.

REFERENCES CITED

The following references are of record in the file of this patent:

UNITED STATES PATENTS

| Number | Name | Date |
|---|---|---|
| Re. 15,904 | Hein | Aug. 26, 1924 |
| 388,591 | Shaubach | Aug. 28, 1888 |
| 1,201,916 | Back | Oct. 17, 1916 |
| 1,441,501 | Hein | Jan. 9, 1923 |
| 1,709,932 | Carson | Apr. 23, 1929 |
| 1,856,132 | Hills | May 3, 1932 |
| 2,071,255 | Dalley | Feb. 16, 1937 |
| 2,101,773 | Bowen | Dec. 7, 1937 |
| 2,371,430 | DePatto | Mar. 13, 1945 |

FOREIGN PATENTS

| Number | Country | Date |
|---|---|---|
| 829,690 | France | July 4, 1938 |